United States Patent [19]

Noda et al.

[11] Patent Number: 4,692,828
[45] Date of Patent: Sep. 8, 1987

[54] MAGNETIC DISK DRIVE CAPABLE OF MECHANICAL CONNECTION TO A DATA PROCESSING INSTRUMENT WITHOUT DEFORMATION

[75] Inventors: Yasushi Noda; Toshihiro Kitahara, both of Tokyo, Japan

[73] Assignee: Teac Corporation, Tokyo, Japan

[21] Appl. No.: 760,407

[22] Filed: Jul. 30, 1985

[30] Foreign Application Priority Data

Jul. 31, 1984 [JP] Japan .......................... 59-119414[U]

[51] Int. Cl.⁴ ............................................. G11B 17/02
[52] U.S. Cl. ...................................... 360/97; 360/99; 360/137
[58] Field of Search .................................. 360/97–99, 360/137

[56] References Cited

U.S. PATENT DOCUMENTS 3,849,800 11/1974 Cuzner et al. ......................... 360/97

FOREIGN PATENT DOCUMENTS 59-42506 3/1984 Japan .

OTHER PUBLICATIONS

Lindner, "Disk Drive Mounting", IBM Tech Disc Bull, vol. 16, No. 3, Aug. 1973, p. 903.

Primary Examiner—Robert S. Tupper
Attorney, Agent, or Firm—Woodcock Washburn Kurtz Mackiewicz & Norris

[57] ABSTRACT

A flexible magnetic disk drive to be mounted between, and fastened to, a pair of opposed holder plates forming parts of the housing of a data processing instrument such as a computer or word processor. The disk drive has a base structure comprising a platform, on which there are mounted such standard components as a drive drive mechanism and a head transport mechanism, and a pair of side walls on the opposite sides of the platform. Usually in the form of an aluminum die casting, the base structure would suffer deformation if it were fastened directly to the holder plates, due to positional errors between their screw holes. The deformation of the base structure is avoided by coupling the base structure to the holder plates via a pair of connectors which are fastened to the opposite side walls of the base structure. Each connector has a pair of lugs each having a hole formed therethrough for receiving screws or like fastener elements passing through holes in the holder plates. Being less in rigidity than the base structure and the holder plates, the connector lugs are deformable to take up possible positional errors between the connector lug holes and the holder plate holes.

3 Claims, 4 Drawing Figures

MAGNETIC DISK DRIVE CAPABLE OF MECHANICAL CONNECTION TO A DATA PROCESSING INSTRUMENT WITHOUT DEFORMATION

BACKGROUND OF THE INVENTION

Our invention relates to an apparatus commonly known as a disk drive, for data transfer with a flexible magnetic disk or like data storage medium. More particularly, our invention pertains to a disk drive with facilities for its mechanical connection to a computer, word processor, or like data processing instrument without any such strain as would adversely affect the performance of the disk drive.

Flexible magnetic disk drives are usually not self contained but are subservient to such data processing equipment as computers and word processors. Many computers and word processors on the market today have built in disk drives because of the widespread acceptance of flexible magnetic disks as compact and inexpensive data storage media. The usual practice in coupling a disk drive to a data processing instruments is to screw the frame or base structure of the disk drive to the housing of the data processing instrument. Usually fabricated by aluminum die casting, the base structure includes a broad platform on which there are mounted such standard components of the disk drive as the disk drive mechanism for imparting rotation to the flexible magnetic disk, and the head transport mechanism for transporting a magnetic transducer head or heads radially of the magnetic disk. The base structure has tapped holes predefined therein for receiving screws or the like that also pass clearance holes preformed in the housing.

A problem has existed, however, in thus fastening the base structure of the disk drive to the housing of the data processing instrument. The screw holes in the disk drive base structure are not necessarily in precise axial alignment with the clearance holes in the data processing instrument housing. Consequently, with the forced insertion of screws in such misaligned holes, the disk drive base structure of aluminum die casting is very likely to be strained, the data processing instrument housing being generally greater in rigidity. The straining of the base structure can seriously affect the performance of the working components of the disk drive mounted thereon. For example, if the screw holes in the disk drive base structure and the clearance holes in the data processing instrument housing are displaced from 0.2 to 0.3 millimeter out of axial alignment, the magnetic transducer head or heads of the disk drive may be displaced as much as five microns, or even more, in a radial direction of the magnetic disk.

SUMMARY OF THE INVENTION

We have hereby found a simple and readily practicable solution to the problem of how to mount a magnetic disk drive to a holder, such for example as the housing of a data processing instrument, without the possibility of affecting the performance of the disk drive.

Briefly, our invention may be summarized as a magnetic disk drive to be mounted to a disk drive holder of relatively rigid material, having a base structure on which there are mounted such standard components of the disk drive as a disk drive mechanism for imparting rotation to a magnetic disk, and a head transport mechanism for transporting a magnetic transducer head radially of the magnetic disk. For coupling the base structure to the disk drive holder, we suggest the use of a connector of smaller rigidity than the disk drive holder and the base structure. The connector is attached to the base structure and is adapted to be fastened to the disk drive holder for mounting the disk drive thereto. Being of a relatively pliant material, the connector is deformable to take up possible positional errors between the base structure and the disk drive holder, thereby protecting the base structure against deformation as a result of its mounting to the disk drive holder.

Preferably, a pair of connectors of identical make may be fastened or otherwise attached to the opposite side walls of the base structure. Each connector is formed to include a pair of connector lugs disposed in spaced apart positions on one side wall of the base structure. Each connector lug has a hole defined therethrough for receiving a screw or like fastener element passing through a hole in the disk drive holder. When the fastener elements are inserted, the connector lugs are deformable to permit the disk drive to be mounted to the disk drive holder without straining the base structure in the face of the misalignment of the connector lug holes and the disk drive holder holes.

The above and other features and advantages of our invention and the manner of realizing them will become more apparent, and the invention itself will best be understood, from a study of the following description and appended claims, with reference had to the attached drawings showing a preferred embodiment of our invention.

DESCRIPTION OF THE PREFERRED EMBODIMENT

We will now describe the disk drive of our invention as adapted for use with a double sided flexible magnetic disk cassette described and claimed in U.S. Pat. No. 4,445,155 filed by Takahashi et al. and assigned to Sony Corporation. The magnetic disk cassette has a flexible magnetic disk rotatably enclosed in a relatively rigid envelope having a sliding, spring loaded shutter for exposing radial portions of the opposite sides of the disk. The flexible magnetic disk has a hub of ferromagnetic material attached centrally thereto. The hub has formed therein a central hole for centering engagement with the spindle of the disk drive and an eccentric slot for engagement with the drive pin of the disk drive. Reference may be had to the noted patent for more details of the magnetic disk cassette, although our invention when taken in its broader aspect has no direct pertinence to this particular type of storage medium.

Figure 1:
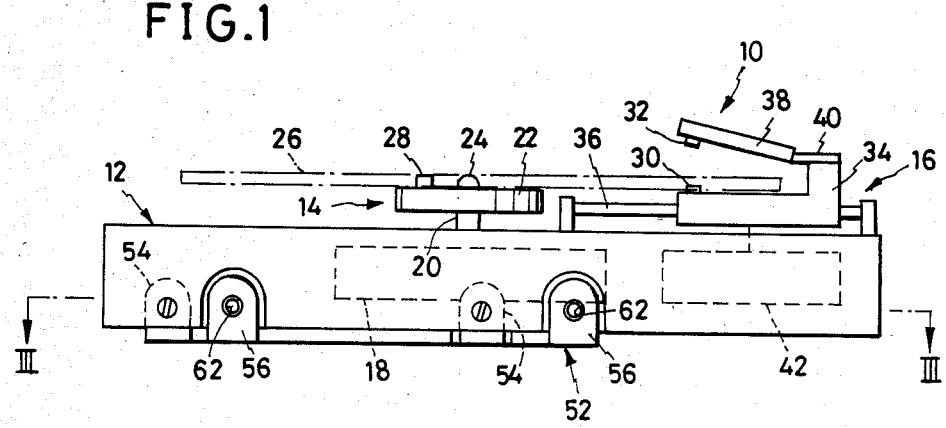
FIG. 1 is an elevation of the flexible magnetic disk drive constructed in accordance with the novel concepts of our invention.

With particular reference to FIG. 1 the exemplified magnetic disk drive 10 has a base structure or frame 12 on which are mounted such standard working components of the disk drive as a disk drive mechanism 14 and a head transport mechanism 16. The disk drive mechanism 14 includes an electric disk drive motor 18 rigidly mounted to the base structure 12 and having an output shaft 20 extending upwardly therefrom. A turntable 22 is nonrotatably mounted on the disk drive motor output shaft 20, with the shaft partly protruding upwardly of the turntable 22 to provide a spindle 24 for centering engagement in the central hole in the hub of the flexible magnetic disk 26. Mounted eccentrically on the turntable 22 is a drive pin 28 for driving engagement in the eccentric slot in the disk hub. The turntable 22 has further mounted thereon a permanent magnet, not shown, for attracting the ferromagnetic hub of the disk 26 into engagement with the spindle 24 and drive pin 28. The disk drive mechanism 14 of the foregoing construction functions to impart rotation to the magnetic disk 26 in a preassigned data transfer position on the disk drive 10. In this data transfer position the magnetic disk 26 makes data transfer to and from a pair of magnetic transducer heads 30 and 32 disposed on its opposite sides.

For transporting these transducer heads 30 and 32 radially of the magnetic disk 26, the head transport mechanism 16 comprises a carriage 34 reciprocably movable along a pair of guide rods 36, one seen, extending in a radial direction of the magnetic disk being held in the data transfer position. The transducer head 30 is mounted directly on the carriage 34. The other transducer head 32 is mounted on the distal end of a head arm 38 which is proximally pivoted on the carriage 34 via a cantilever spring 40 thereby to be biased toward the carriage 34. Normally held in the illustrated position against the force of the cantilever spring 40 by a head control mechanism, not shown, the head arm 38 is to be sprung toward the carriage 34 for the establishment of data transfer contact of the pair of transducer heads 30 and 32 with the opposite faces of the magnetic disk 26. The head transport mechanism 16 further includes a head transport motor 42 of the electrical stepping type coupled to the carriage 34 via a rotary to linear converter, not shown, such as a steel belt wound into the shape of the Greek alpha. Thus, with the incremental rotation of the head transport motor 42, the pair of transducer heads 30 and 32 are jointly movable radially of the magnetic disk 26 for track to track accessing.

Figure 2:
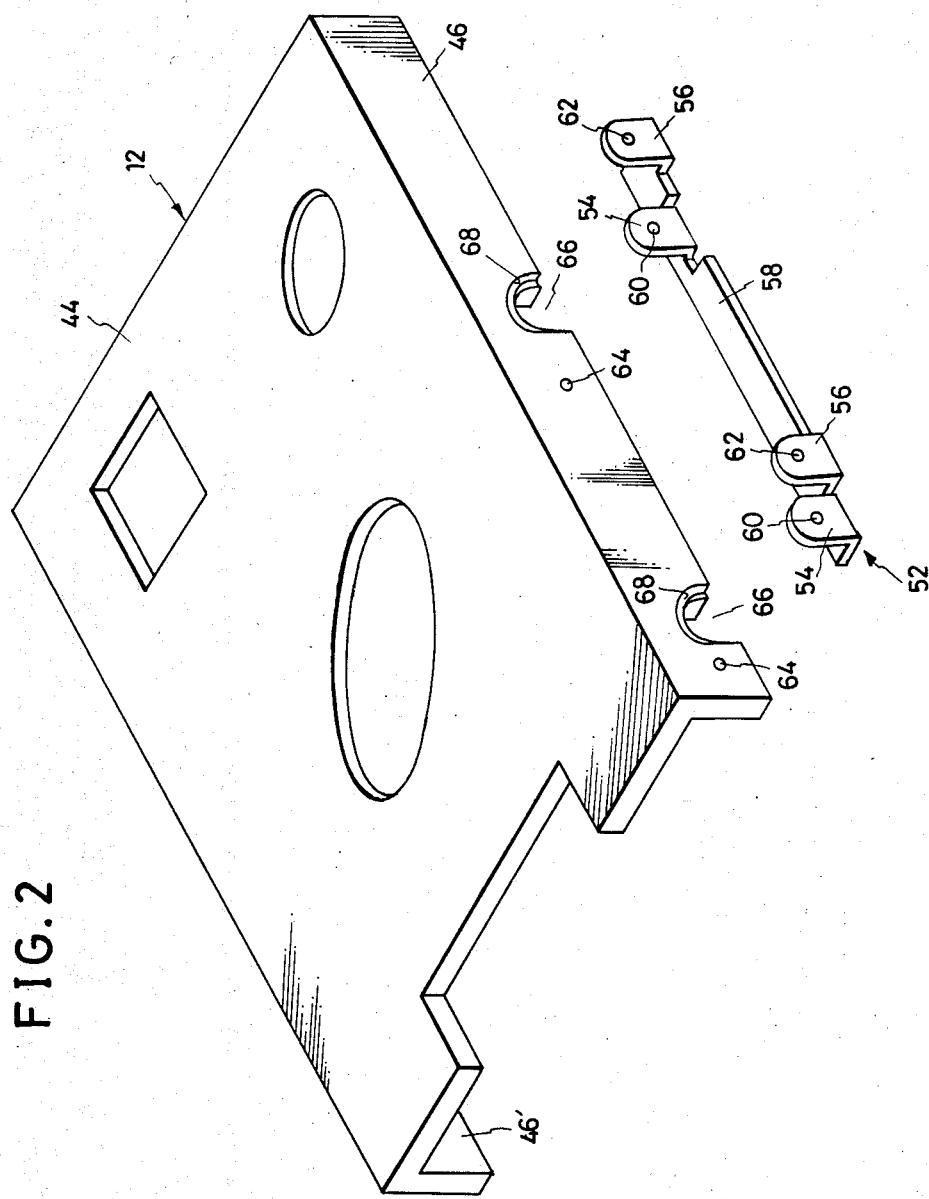
FIG. 2 is a perspective view of the base structure of the magnetic disk drive of FIG. 1, shown together with one of the connectors which is shown detached from the base structure in order to clearly reveal its configuration.

As better shown in FIG. 2, the base structure 12 is an aluminum die casting integrally comprising a platform 44 and a pair of depending side walls 46 and 46' on its opposite sides. The platform 44 has mounted thereon not only the above described disk drive mechanism 14 and head transport mechanism 16 but also the guide means for guiding the magnetic disk 26 to the data transfer position on the platform 22, the head control mechanism for controlling the travel of the upper transducer head 32 into and out of engagement with the magnetic disk 26, the means for opening the shutter of the loaded disk cassette, etc. We have not shown these additional means on the platform 44 because of their conventional and well known nature.

Figure 4:
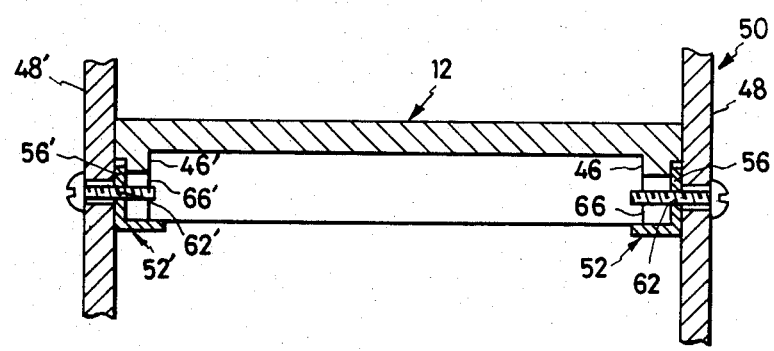
FIG. 4 is a vertical section taken along the line IV—IV of FIG. 3 and also showing the mechanical connections between the base structure of the disk drive and the holder plates in accordance with our invention.
Figure 3:
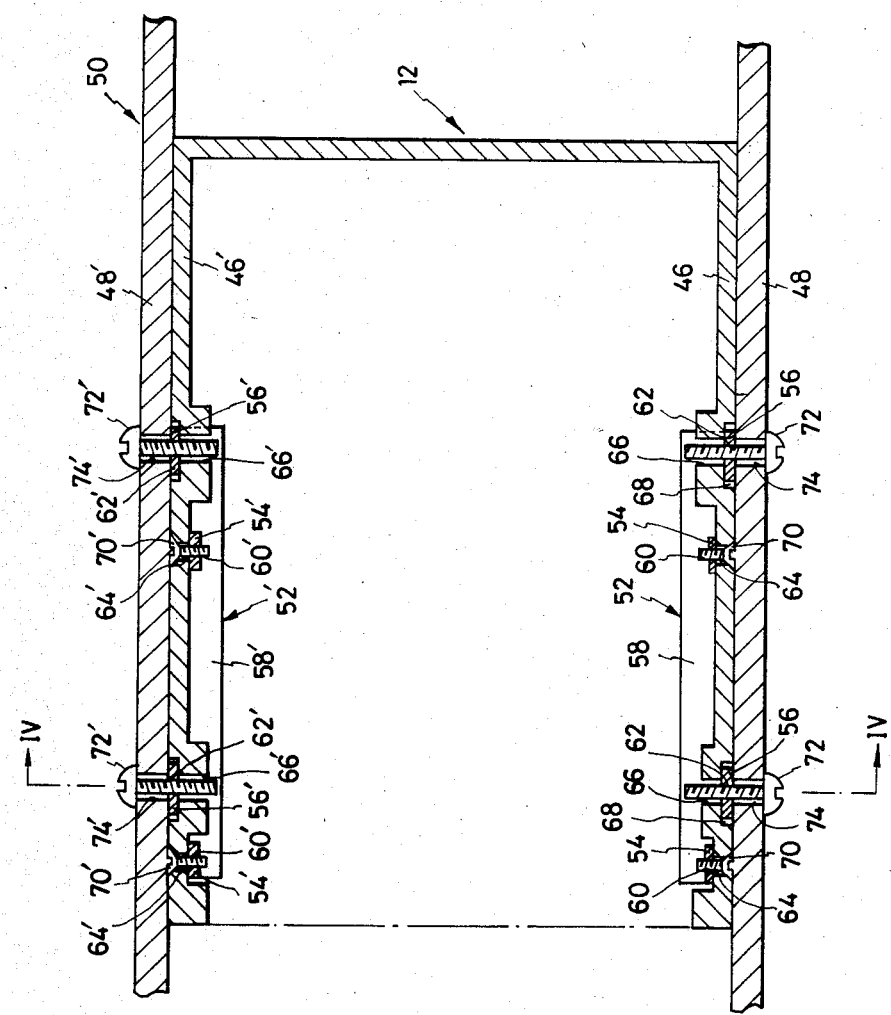
FIG. 3 is a horizontal section through the magnetic disk drive of FIG. 1 as mounted between a pair of holder plates constituting parts of the housing of a data processing instrument for combined use with the disk drive, the section being taken along the line III—III in FIG. 1 and showing in particular the mechanical connections between the base structure of the disk drive and the holder plates in accordance with our invention.

As will be understood from a consideration of FIGS. 3 and 4, the base structure 12 of the disk drive 10 of the foregoing construction is intended to be mounted between, and fastened to, a pair of parallel spaced holder plates 48 and 48' of disk drive holder 50 constituting part of the housing of a data processing instrument, such as a computer or a word processor, for combined use with the disk drive 10. Instead of being fastened directly to the disk drive holder 50, as has been the case heretofore, the base structure 12 is fastened thereto via a pair of connectors 52 and 52' in accordance with the novel concepts of our invention.

It will be observed from FIGS. 3 and 4, taken together with FIG. 2, that the two connectors 52 and 52' are of like configuration. Further the two depending side walls 46 and 46' of the base structure 12 are coupled to the pair of holder plates 48 and 48' via the pair of connectors 52 and 52', respectively, in a like manner. We will therefore describe in detail only one, 52, of the connectors 52 and 52' in conjunction with the associated side wall 46 of the base structure 12 and the holder plates 48 of the disk drive holder 50, it being understood that the same description applies to the other connector 52' as well as to the other side wall 46' and the other holder plate 48'. We will also indicate the various parts of the connector 52', side wall 46' and holder plate 48' by priming the reference numerals used to denote the corresponding parts of the connector 52, side wall 46 and holder plate 48.

The representative connector 52 is fabricated from a metal having smaller rigidity than the base structure 12 and disk drive holder 50. As best illustrated in FIG. 2, the connector 52 comprises a first pair of connector lugs 54, a second pair of connector lugs 56, and a connective strip 58 serving to interconnect and hold the first and second pairs of connector lugs 54 and 56 in predetermined positions thereon. Both first 54 and second 56 connector lugs are bent right angularly from the connective strip 58 so as to be held flatwise against the opposite faces of the depending side wall 46 of the base structure 12 as the connective strip is placed on the underside of the base structure side wall 46. The first pair of connector lugs 54 have each a tapped hole 60 defined therethrough, and the second pair of connector lugs 56 have each a tapped hole 62 of greater diameter defined therethrough. The tapped holes 60 in the first pair of connector lugs 54 are in axial alignment with countersunk holes 64 in the base structure side wall 46. The tapped holes 62 in the second pair of connector lugs 56 are in register with approximately semicircular recesses 66, complete with enlargements 68, in the base structure side wall 46.

FIGS. 3 and 4 indicate that the connector 52 is mounted to one of the base structure side walls 46 by screws 70 passing the countersunk holes 64 in the side wall and engaged in the tapped holes 60 in the first pair of connector lugs 54. With the connector 52 thus mounted in position on the base structure 12, the first pair of connector lugs 54 are arranged interiorly of the side wall 46, and the second pair of connector lugs 56 exteriorly of the side wall 46. The connective strip 58 underlies the side wall 46 and protrudes interiorly therefrom. It will further be noted from FIGS. 3 and 4 that the second pair of connector lugs 56 are nested in the enlargements 68 of the recesses 66 in the side wall 46, so that the tapped holes 62 in these connector lugs 56 are in register with the recesses 66. The connector 52 can thus be held mounted in position on the base structure 12 against the possibility of detachment or displacement.

We have set forth in the preceding paragraph the state of the disk drive 10 before being mounted to the disk drive holder 50. We have illustrated the disk drive 10 in this state in FIG. 1.

We will now proceed to the discussion of how the above disk drive 10, complete with the pair of connectors 52 and 52', is mounted to the disk drive holder 50. FIGS. 3 and 4 illustrate the base structure 12 of the disk drive 10 mounted between and fastened to the pair of holder plates 48 and 48' of the disk drive holder 50. The representative holder plate 48 is fastened to the representative side wall 46 of the base structure 12 by screws 72 passing through clearance holes 74 in the holder plate and engaged in the tapped holes 62 in the second pair of connector lugs 56 of the representative connector 52. The recesses 66 in the base structure side wall 46 are intended to receive with clearances the end portions of the screws 72 projecting beyond the second pair of connector lugs 56.

In thus mounting the disk drive 10 to the disk drive holder 50, the tapped holes 62 in the second pair of connector lugs 56 may not be in exact axial alignment with the clearance holes 74 in the holder plate 48. Conventionally, the misalignment of the screw holes in the disk drive holder and the base structure will have resulted in the straining of the base structure 12 and, possibly, in the consequent malfunctioning of the disk drive 10. We have precluded this possibility by providing the connector 52 of smaller rigidity than that of the base structure 12 and disk drive holder 50. If there is misalignment between tapped holes 62 and clearance holes 74, the second pair of connector lugs 56 will be either deformed or displaced when the screws 72 are forced into their holes 62, thereby taking up the misalignment and so protecting the base structure 12 from straining. It is self evident that the other connector 52' functions in a like manner to take up possible positional errors between the tapped holes 62' in its second pair of connector lugs 56' and the clearance holes 74' in the associated holder plate 48'.

Although we have shown and described our invention in terms of but one preferable embodiment thereof, we recognize that our invention could be embodied in other forms within the usual knowledge of the skilled artisans. For example, the second pair of connector lugs 56 or 56' of each connector could be disconnected from each other, instead of being interconnected by the connective strip 58 or 58', and could be separately fastened or otherwise attached to the base structure 12. Further the pair of connectors could be fastened to the under sides of the depending side walls 46 and 46' of the base structure 12, instead of to their inside surfaces as in the illustrated embodiment. It will also be seen that the recesses 66 and 66' in the base structure side walls 46 and 46' might be replaced by holes of greater diameter of the tapped holes 62 and 62' in the connecor lugs 56 and 56'. All these and other modifications or alterations that will readily occur to one skilled in the art are considered to fall within the scope of our invention.

We claim:

1. A magnetic disk drive to be mounted between a pair of disk drive holder plates of data processing equipment, the disk drive including a base structure having mounted thereon a disk drive mechanism and a head transport mechanism, wherein the improvement resides in connector means through which the base structure is to be fastened to the disk drive holder plates of the data processing equipment, the connector means comprising a pair of metal made connectors disposed one on each side of the base structure, each connector having an elongated connective strip secured to the base structure, and a pair of connector lugs formed adjacent both ends of the connective strip in one piece therewith and protruding therefrom each connector lug having defined therein a hole for receiving a fastener element for fastening the base structure to the disk drive holder plates, the connector lugs being less in rigidity than the disk drive holder plates and the base structure so that the connector lugs are deformable, when the fastener elements are inserted in their holes for mounting the base structure to the disk drive holder plates, to take up possible positional errors between the base structure and the disk drive holder plates and hence to protect the base structure from deformation.

2. The magnetic disk drive of claim 1 wherein each connector further comprises a second pair of connector lugs formed in one piece with the connective strip, each connector being secured to the base structure by having the second pair of connector lugs fastened thereto.

3. The magnetic disk drive of claim 2 wherein the base structure is formed to include a pair of side walls on its opposite sides, each side wall having defined therein a pair of apertures in register with the holes in the first recited pair of connector lugs of one connector for receiving the fastener elements in mounting the base structure to the disk drive holder plates and a pair of holes in register with holes in the second pair of connector lugs of one connector for receiving additional fastener elements by which the connector is fastened to the base structure.

* * * * *